INVENTOR.
Edward S. Bettis
BY
Roland A. Anderson
ATTORNEY.

July 26, 1966 E. S. BETTIS 3,262,856

FUSED-SALT-FUELED, MOLTEN-METAL-COOLED POWER BREEDER REACTOR SYSTEM

Filed Jan. 14, 1965 3 Sheets-Sheet 2

INVENTOR.
Edward S. Bettis

BY

Roland A. Anderson

ATTORNEY.

INVENTOR.
Edward S. Bettis
BY
Roland A. Anderson
ATTORNEY.

United States Patent Office 3,262,856

Patented July 26, 1966

1

3,262,856

FUSED-SALT-FUELED, MOLTEN-METAL-COOLED POWER BREEDER REACTOR SYSTEM

Edward S. Bettis, Knoxville, Tenn., assignor to the United States of America as represented by the United States Atomic Energy Commission Filed Jan. 14, 1965, Ser. No. 425,645
6 Claims. (Cl. 176—18)

This invention relates generally to neutronic reactors and more specifically to a fused-salt fueled, molten-metal-cooled power breeder reactor system.

As used in this application, the following terminology is defined below.

Active core region: The inner portion of a neutronic reactor which contains fissile material and is charcterized by a multiplication constant greater than unity.

Blanket region: The region immediately surrounding the active core region containing fertile material for conversion into fissile material by neutron capture.

Breeder reactor: A neutronic reactor which produces fissile material identical with that used to maintain the fission chain. Further limited herein to reactors producing more fissile material than they consume.

Breeding ratio: The ratio of the number of fissile atoms produced to the number of the same kind that have been consumed.

Doubling time: The time required for a breeder reactor to produce a surplus amount of fissile material equal to that required for the initial charge of the reactor.

Fissile material: Material which will undergo fission with neutrons of any energy.

Fertile material: Material which can be converted into fissile material through neutron capture.

Delayed neutrons: Neutrons which are released later than $10^{-14}$ sec. after the instant of fission.

Moderator material: A non-gaseous material for which the ratio $$\frac{\xi\sigma_s}{\sigma_a}$$

is greater than 10, wherein $\xi$ is the average loss in the logarithm of the energy of a fast neutron per elastic collision within the material, $\sigma_s$ is the thermal neutron elastic scattering cross section per atom of material, and $\sigma_a$ is the thermal neutron absorption cross section per atom of the material.

Thermal reactor: A neutronic reaction in which most of the fission result from the absorption of neutrons having a substantially Maxwellian number-energy distribution about an energy value equal to KT where K is a constant and T is the temperature in degrees Kelvin.

Fast reactor: A neutronic reactor in which most of the fissions result from the absorption of neutrons of energy greater than 100,000 electron volts.

Fused-salt-fueled reactor systems of prior design have been generally characterized by several disadvantages which have lessened their desirability as power reactors. One such disadvantage has been the large fuel inventory required where the circulating fuel fills reactor secondary systems including the reactor heat exchange system, associated pumps, and piping. The fuel volume required in the secondary systems may be double or triple the volume of fuel required to sustain a chain reaction in the reactor core active region alone. Such large volumes of fuel require significant design and operating precautions to prevent inadvertent criticality of the fuel at a location other than the core active region.

Another disadvantage of the prior art designs was that means had to be provided to maintain the fuel salt in the secondary system at temperatures above its melting point which is very high.

2

Intensely radioactive fuel, in circulating through reactor secondary systems, also creates a serious radiation safety hazard to reactor operating and maintenance personnel. Additional shielding must be provided about the secondary systems and remote maintenance procedures developed as direct maintenance is impossible on highly radioactive system components. Remote maintenance procedures and increased shielding requirements add substantially to the operating and capital costs of a reactor system.

Another difficulty encountered in circulating fuel systems is that of delayed neutrons which are released by the circulating fuel over a period of time following fission. A large portion of the delayed neutrons are released after the fuel leaves the reactor active core region causing problems in radiation shielding, neutron economy, and reactor control.

It is, therefore, a general object of the invention to provide a fused-salt-fueled reactor where substantially all of the fused-salt fuel remains in the reactor core region.

Another object of the invention is to provide a fused-salt-fueled power reactor whose secondary steam generating system is substantially free of radioactivity.

Another object of the invention is to provide a fused-salt-fueled power reactor wherein at least a portion of the reactor active core portion structural material is shielded from the corrosive effects of the fused-salt fuel.

Another object of the invention is to provide a fused-salt reactor wherein substantially all delayed neutrons are released in the reactor active core and blanket regions.

Another object of the invention is to provide a fused-salt-fueled reactor wherein heat exchange takes place directly between immiscible fluids.

Still another object of the invention is to provide an improved method of fuel circulation in a fused-salt-fueled reactor.

Other objects of the invention will become apparent from an examination of the following description of the invention and the appended drawings, wherein.

In accordance with the present invention, a fused-salt-fueled, molten-metal-cooled breeder reactor is provided wherein molten metal is dropped vertically through fused-salt fuel to cool and circulate it. A fused-salt active region floats on a molten metal reservoir within a containment vessel. Vertical graphite columns define fuel channels in the reactor active region while providing neutron moderation. Fertile fused salt is disposed about the graphite columns to provide breeding.

Direct cooling of the fused-salt fuel is achieved by dropping an immiscible coolant directly through the fused salt to remove heat therefrom without the use of a heat exchanger. The coolant selected must be of greater density than the fused-salt fuel to promote pumping and to aid in separation of phases after its contact with the fused salt. The coolant must also be compatible with the fused salt and have physical and nuclear properties which permit its use under reactor operating conditions. Important nuclear and physical properties include radiation stability, vapor pressure, melting point, and thermal conductivity. Metallic lead possesses all the essential requirements for the molten coolant and will be used in the following description and in obtaining the computational results provided therein.

Figure 1:
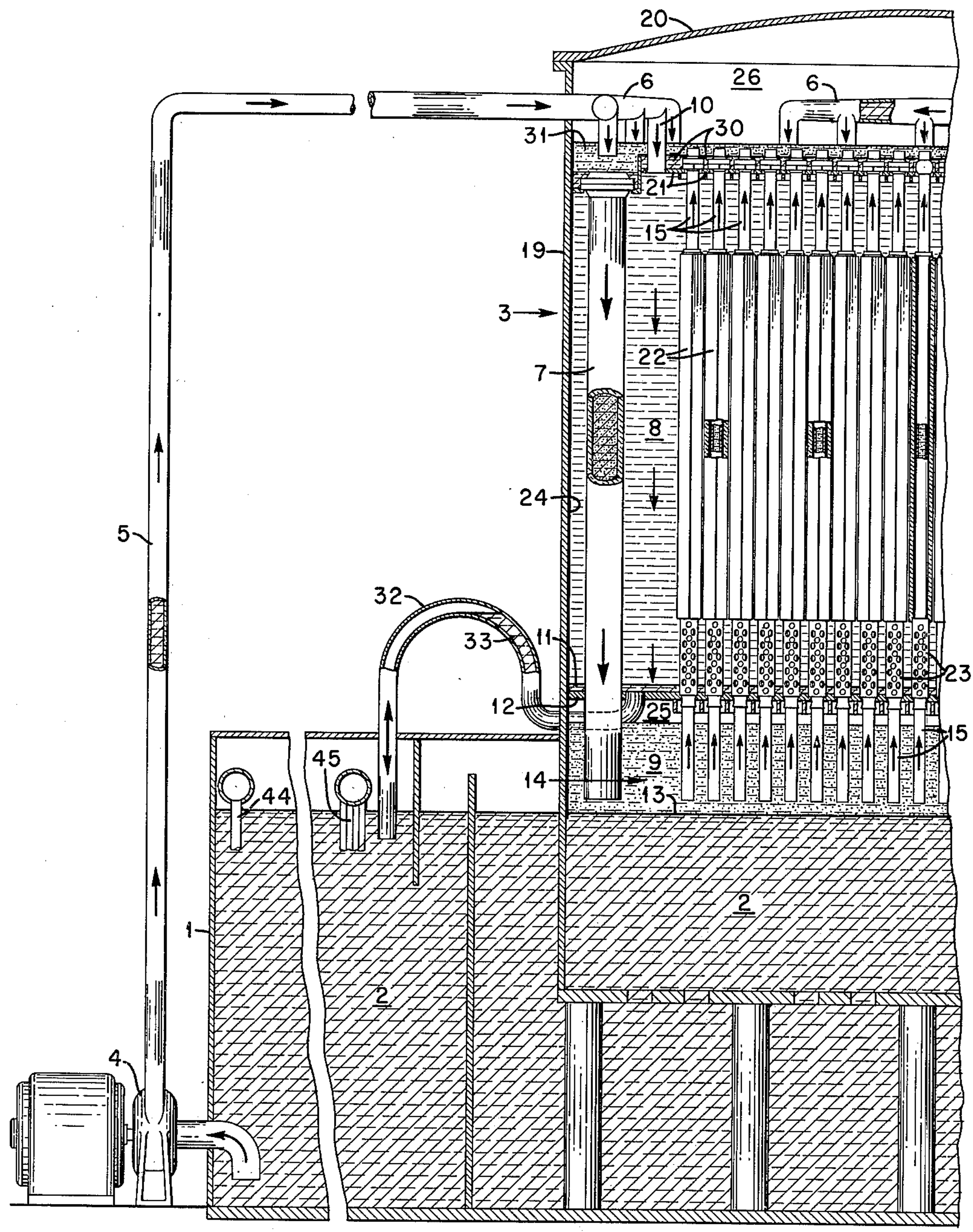
FIG. 1 is a vertical sectional view of a representative segment of a neutronic reactor constructed according to the present invention.

In order to facilitate an understanding of the invention, reference is first made to FIG. 1 of the accompanying drawings wherein a thermal breeder reactor designed in accordance with the invention is illustrated. The conceptual design of FIG. 1 is based on a power level of 2,500 thermal megawatts.

FIG. 1 gives an overall elevation view of a segment of the reactor of sufficient size to illustrate its structure and principle of operation. Conventional secondary equipment such as turbines, condensers, and generators, has been generally omitted for simplicity and because the utilization of such equipment follows standard procedures well known in the power generation art.

A large reservoir 1, fabricated of Croloy, is substantially filled with molten lead 2. Reservoir 1 is cruciform in shape in the horizontal plane with a cylindrical reactor vessel 3 being located at the intersection of the cruciform reservoir and on top of it. The reactor vessel is 12 feet in diameter and 12 feet high. This feature of the reactor is further illustrated in FIG. 3 where a horizontal plan view of the lead reservoir and reactor core is schematically illustrated. The depth of molten lead 2 in reservoir 1 is 13 feet, leaving 1 foot of inert gas over the lead. Each leg of the reservoir has a 20-foot inside width and a 30-foot length with a 14-foot depth. Centrifugal pumps 4 are located at the end of each leg of the reservoir where they remove molten lead and pump it through return fuel tubes 15 where it takes part in the fission chain reaction. Graphite fuel tubes 15 are illustrated in greater detail in FIG. 2.

The lead droplets, having removed fission induced heat from the fused-salt fuel as it passed through the downcomer pipes, blend with the lead in reservoir 1 while continuing downwardly and outwardly through each of the legs of reservoir 1 due to the action of centrifugal pumps 4 in removing lead from the ends of the legs for recirculation through the reactor. As it moves outwardly through the legs of the reservoir, the hot lead flows across boiler tubes 44, illustrated in FIG. 4 where it gives up a portion of its heat to produce steam. Boiler tubes 44 are inserted directly into each leg of the reservoir and may be removed therefrom for repair. There are two boiler, two superheater, and two reheater units in each of the four legs comprising molten lead reservoir 1.

Figures 3, 4:
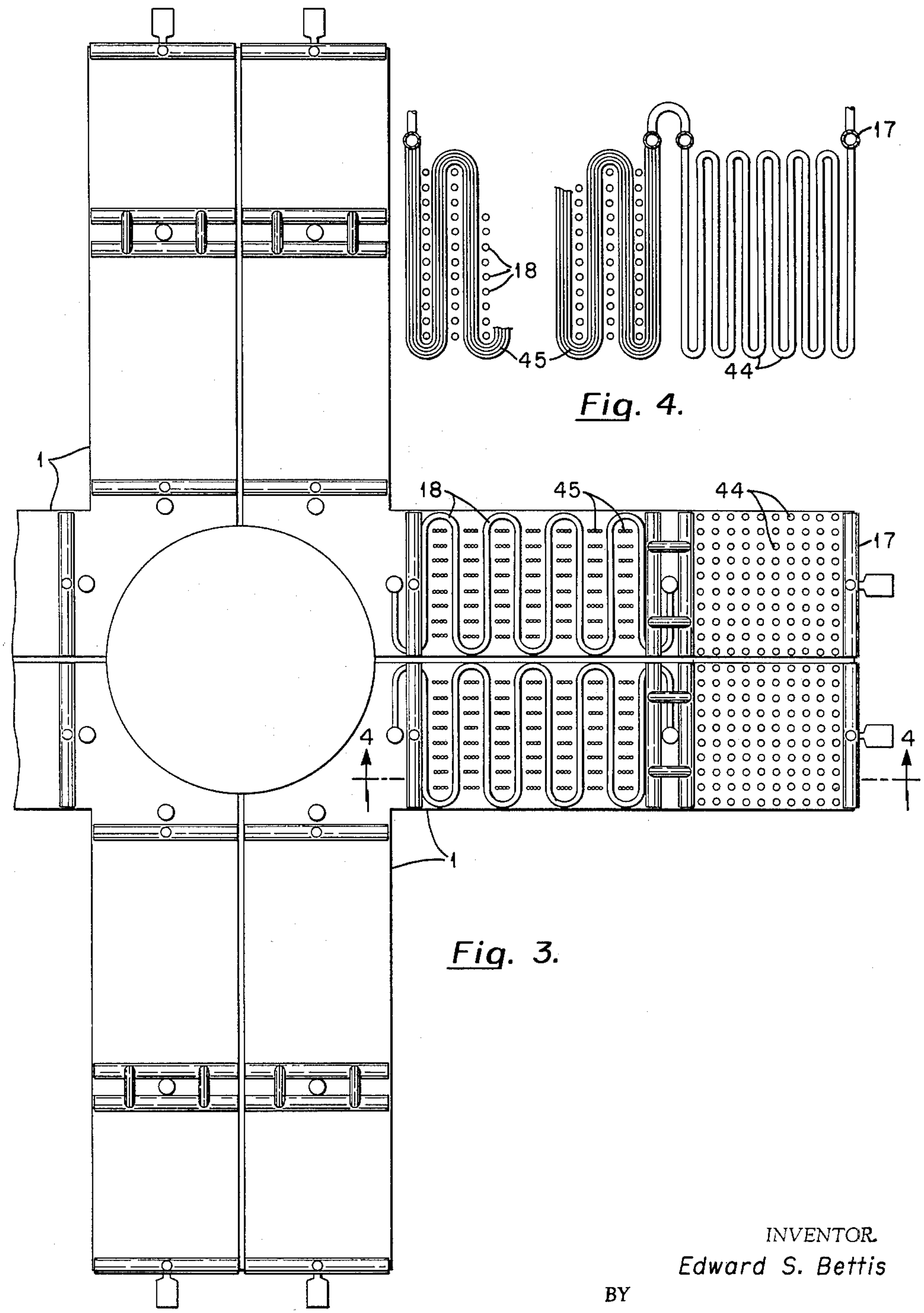
FIG. 3 is a horizontal elevational view, partly cut away, of the entire reactor represented by the reactor segment of FIG. 1.
FIG. 4 is a vertical sectional view of one leg of the lead reservoir of FIG. 3 illustrating the general layout of the steam generating system.

The steam generating system as shown in detail in FIG. 4, comprises a single pass boiler, in which feed water is introduced into serpentine boiler tubes 44 from an inlet water header 17. The water flow is counter flow to the lead flow. As the water flows through the serpentine tubes it is heated, vaporized and passed into another series of serpentine tubes 45 where it is superheated. Exhaust steam from the high pressure turbine (not shown) is returned to a system of reheater tubes 18 immersed in the lead within reservoir 1 wherein the steam is reheated and sent to a low pressure turbine (not shown). Reheater tubes 18 are also illustrated in FIG. 3. Additional steam system parameters are given in Table I below.

TABLE I

*Steam system parameters*

| | Boiler | Superheater | Reheater |
|---|---|---|---|
| Heat Load | $4.15\times10^9$, B.t.u./hr | 2.51 | 1.58. |
| Flow | $6.93\times10^6$, lb./hr | $6.93\times10^6$, lb./hr | $5.02\times10^5$, lb./hr. |
| Temperature In | 520° F | 662° F | 495° F. |
| Temperature Out | 662° F | 1,000° F | 1,000 ° F. |
| Pressure (max.) | 2,500 | 2,500 | 475. |
| No. Units | 8 | 8 | 8. |
| Heat Flux | 142,000 B.t.u./ft.$^2$/hr | 24,400 | 72,500. |
| Pipe, O.D | 1½″ | 1¼″ | 1¼″. |
| Wall Thickness | .125″ | .250″ | .070″. |
| Heat Transfer Area | 29,000 ft.$^2$ | 104,000 | 21,784. |
| Configuration | 2 Vert. Loops Parallel | 6 Vert. Loops Parallel | Horizontal Loops. |
| Pressure Drop | | ≈60 p.s.i | ≈10 p.s.i. |
| Length of Tube Legs | 13′ | 13′ | Av. 15′. |
| No. of Vert. Legs | 12 | 16 | (Horiz.) 3. |
| Max. Velocity | $H_2O$, 10′/sec.; steam, 50′/sec | 78′/sec | 178′/sec. |

pipes 5 to the top of reactor vessel 3. Return pipes 5 terminate in discharge manifolds 6 arranged to discharge the molten lead vertically downward into 24 graphite downcomer pipes 7 which pass vertically through the blanket region 8 of the reactor. The graphite downcomer pipes have a 14-inch inside diameter and a 1-inch wall. As the molten lead falls downwardly through the downcomer pipes 7, it mixes intimately with the fused-salt fuel 9, thereby causing the fused salt fuel to circulate due to the drag on the salt by the heavier lead droplets as they fall therethrough. In addition to causing the fused-salt fuel to circulate, the molten lead also removes the heat which is generated therein when the salt passes through the active core region and undergoes fissioning. A similar circulation and heat removal scheme is used to circulate and remove heat from the blanket salt. Several outlets 10 from discharge manifolds 6 discharge directly into blanket region 8. The lead falls downward through region 8 until it reaches the layer of lead 11 covering lower tube sheet 12.

The heated lead droplets falling through downcomer pipes 7 continue downward until they meet and merge with the top surface 13 of the molten lead contained in reservoir 1. The fused-salt fuel, having a density approximately ¼ that of the molten lead and being immiscible therewith, separates from and floats on top of the lead in region 14 before flowing up through graphite The molten lead droplets are heated from 700° F. to 1100° F. as they fall through downcomer pipes 7. The temperature of the fused-salt fuel decreases until it reaches thermal equilibrium with the lead in the downcomer pipes and is also at 1100° F. at the bottom of the downcomer pipes and in region 14 above the molten lead in reservoir 1 at the inlet to the core active region. In rising through the reactor active region defined by fuel tubes 15, the temperature of the molten-salt fuel is raised from 1100° F. to 1396° F.

The reactor has been designed to operate as a breeder reactor in the thermal energy range using uranium as the fissile material and thorium as the fertile material. Each of these materials is in the form of a fluoride salt dissolved in a complex melt of the fluorides of beryllium and lithium-7. The two fluorides are kept separate, the fissile stream (fuel salt) circulating through the core and the fertile stream circulating in the blanket region 8 and between the graphite columns of the core active region. The circulation and cooling of each stream is accomplished by the action of molten lead falling therethrough.

The reactor vessel 3 is a cylinder 19 with a flanged domed top 20 located at the center and extending above the cruciform tank forming reservoir 1. In this cylinder are an upper metal tube sheet 21 and a lower metal tube sheet 12, separated by a distance of 10 feet. Vertically oriented graphite fuel tubes 15 run between tube sheets 21 and 12 to form fuel channels through which the fuel salt flows. Tubes 15 have sections of moderator graphite 22 fixed around them to provide a hexagonal cross section for a length of 6 feet, leaving two feet of tube without moderator at each end. Perforated graphite tubes 23 provide vertical support to section 22 of moderator graphite. The fuel tubes have a 4-inch inside diameter and a ⅜-inch wall and are located on a triangular pitch to form a 9-foot diameter tube matrix. This leaves an annular 2-foot-thick thorium-containing blanket region 8 surrounding the active core region. The thorium-containing salt which fills the blanket region 8 also permeates the interstices between the sections of moderator graphite 22 in the core active region. A 20 mil niobium liner 24 is provided on the inner surface of cylinder 19 to prevent corrosion of the Croloy cylinder by the fused salt fuel and blanket in contact therewith. The niobium liner covers only that portion of cylinder 19 which contacts the fused salt.

The top surface 13 of the molten lead in reservoir 1 lies 2 feet below lower tube sheet 12. To start up the reactor the fuel salt is first introduced into this space and floats on the lead to a depth of 1¾ feet. A gas space 25 remains between lower tube sheet 12 and the top of the fuel salt in region 14. When molten lead initially flows down the downcomer pipes 7, inert gas from the space 26 above the molten salt on top of upper tube sheet 21 is entrained therein and discharged out of the bottom of the pipes from where it rises to gas space 25. The pressure differential created by the gas thus entrapped in gas space 25 causes the fuel salt in region 14 to rise through fuel tubes 15 and overflow into downcomer pipes 7, the top open ends of which are simultaneously receiving molten lead from discharge manifolds 6, whereupon lead and salt flow together and fill the entire volume of the downcomer pipes. The downcomer pipes 7 are thus primed and pumping action is established. Additional reactor parameters for the present embodiment are provided in Table II below.

TABLE II

*Reactor parameters*

| | |
|---|---|
| Thermal power | 2500 M.W. |
| Fuel composition, mole percent. | $Li^7F$—68%, $BeF_2$—31%, $UF_4$—1%. |
| Fissile material | $^{233}U$. |
| Fertile material | $^{232}Th$. |
| Fuel vol. | 187 ft.³. |
| Fissile inventory | 645 kg. |
| Specific power | 4 M.W./kg. |
| Fuel salt in core | 9,78 vol. percent. |
| Mod. in core | 80 vol. percent. |
| Blanket salt in core | 10.21 vol. percent. |
| Velocity of fuel | 18′ sec. |
| Temperature inlet, ° F. | 1100. |
| Temperature outlet, ° F. | 1396. |
| Breeding ratio | 1.0824. |
| Fissile yield percent fissile inventory per yr. | 9.65. |
| Fuel processing cycle time | 37.6 days. |
| Fuel cycle cost | .1089 mils/kwh. |
| Blanket salt inventory | 997 ft.³. |
| Blanket composition | $Li^7F$—71%, $ThF_4$—29%. |
| Blanket processing time | 34.1 days. |
| Blanket salt density | 280 lbs./ft.³. |
| Blanket and fuel melting point | 1050° F. |
| Core height | 6.1 ft. |
| Core diameter | 9 ft. |

As the molten fuel salt rises from region 14 into fuel tubes 15 the level of fuel salt in region 14 gradually drops until only 4 inches of fuel salt remains floating on the lead surface in region 14 when fuel tubes 15 and downcomer pipes 7 have become completely filled with molten fuel salt. The ends of fuel tubes 15 and downcomer pipes 7 remain submerged in the 4 inches of fuel salt which remains floating on the lead surface.

The free liquid level and gas space 25 below lower tube sheet 12 is used to introduce enriched fuel salt and to remove fuel salt for processing during reactor operation. The space between the lower tube sheet 12 and the top surface 13 of the molten lead in reservoir 1 represents a safe configuration into which the entire fuel inventory may be stored subcritically whenever desired. Pressurizing the gas space 26 above the top of the reactor core while venting the gas space 25 below the lower tube sheet results in a rapid dumping of all the molten-fuel salt into region 14.

Figure 2:
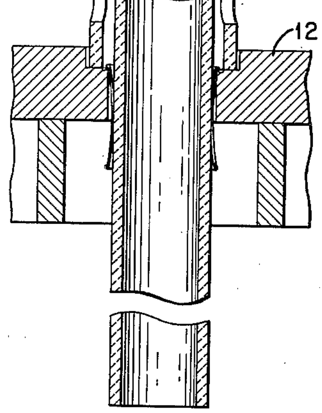
FIG. 2 is an enlarged vertical sectional view of a graphite fuel tube from the neutronic reactor of FIG. 1.

A more detailed description of the construction of graphite fuel tubes 15 and associated components is provided in FIG. 2. Near the top of each tube 15 is brazed a spherical collar section 27 of graphite. Metal ring clamps 28 and 29 are placed above and below the spherical collar, respectively. Metal ring clamps 28 and 29 are bolted into upper tube sheet 21 so as to grip the top of fuel tube 15 in a ball-and-socket clamp. Since the metal ring clamps 28 and 29 have a greater coefficient of thermal expansion than the graphite collar 27, the ball-and-socket joint defined thereby is always free under high temperature operating conditions.

A molten lead seal is provided to prevent molten-fuel salt on the top of upper tube sheet 21 from leaking through the ball-and-socket joints into the moderator and blanket salt region below. The molten lead seal is provided by discharging a small continuous stream of molten lead onto the top of upper tube sheet 21. An upturned edge on upper tube sheet 21 allows lead to accumulate to a depth of two inches forming a molten layer of lead 30 on the top of the tube sheet. Molten layer of lead 30 is shown in FIG. 1. The fuel salt which discharges through the top of fuel tubes 15 then floats on top of lead layer 30 as its flows to the downcomer pipes 7 which are 6 inches below the level of the upper tube sheet in an annular collection basin 31. Any leakage which may occur through the ball-and-socket joints supporting fuel tubes 15 is lead leakage which falls harmlessly through the blanket salt to lead layer 11 on lower tube sheet 12. A second important consideration in providing a lead layer on upper tube sheet 21 is that of protecting it from the corrosive effects of the molten-fuel salt thereby permitting the use of material in the upper tube sheet which is otherwise susceptible to corrosion by the molten-fuel salt.

The bottom of each fuel tube 15 simply extends through a clearance hole in the lower tube sheet 12. Each tube is free to move axially as much as is required to accommodate dimensional changes due to nuclear irradiation or temperature.

The lower tube sheet 12 is also covered by a 2-inch layer of lead 11. The blanket coolant overflow pipes 32 (only one shown) assure the layer of lead 11 by balancing the head provided by the blanket salt in the reactor and the lead in layer 11 with a head of lead in the rising leg 33 of overflow pipes 32. Before providing the initial charge of blanket salt in the reactor, the layer of lead 11 is provided on tube sheet 12 to a depth slightly greater than that desired during reactor operation. The blanket salt is then inserted into the reactor where it floats on lead layer 11. As the depth of the blanket salt is increased, the excess lead in lead layer 11 is displaced up the rising leg 33 of overflow pipes 32 until it reaches the top of the rising leg at which point the blanket salt fills the core vessel to a point several inches below the upper tube sheet 21. Additional lead which passes through the blanket salt as coolant and from leakage about the spherical collars 27 supporting fuel tubes 15, simply causes a corresponding amout of lead to be displaced through overflow pipes 32 thereby returning to reservoir 1. Means (not shown) for preventing a siphoning action from developing are provided in overflow pipes 32.

The entire reactor complex is thermally insulated to minimize the possibility of a fuel or lead coolant freeze-up. A fossil fuel steam generator is used to heat the lead reservoir to receive the molten lead coolant. The lead is then circulated to bring the entire unit up to operating temperature at which time the molten-fuel salt and blanket salt charge are added to the reactor.

Figure 5:
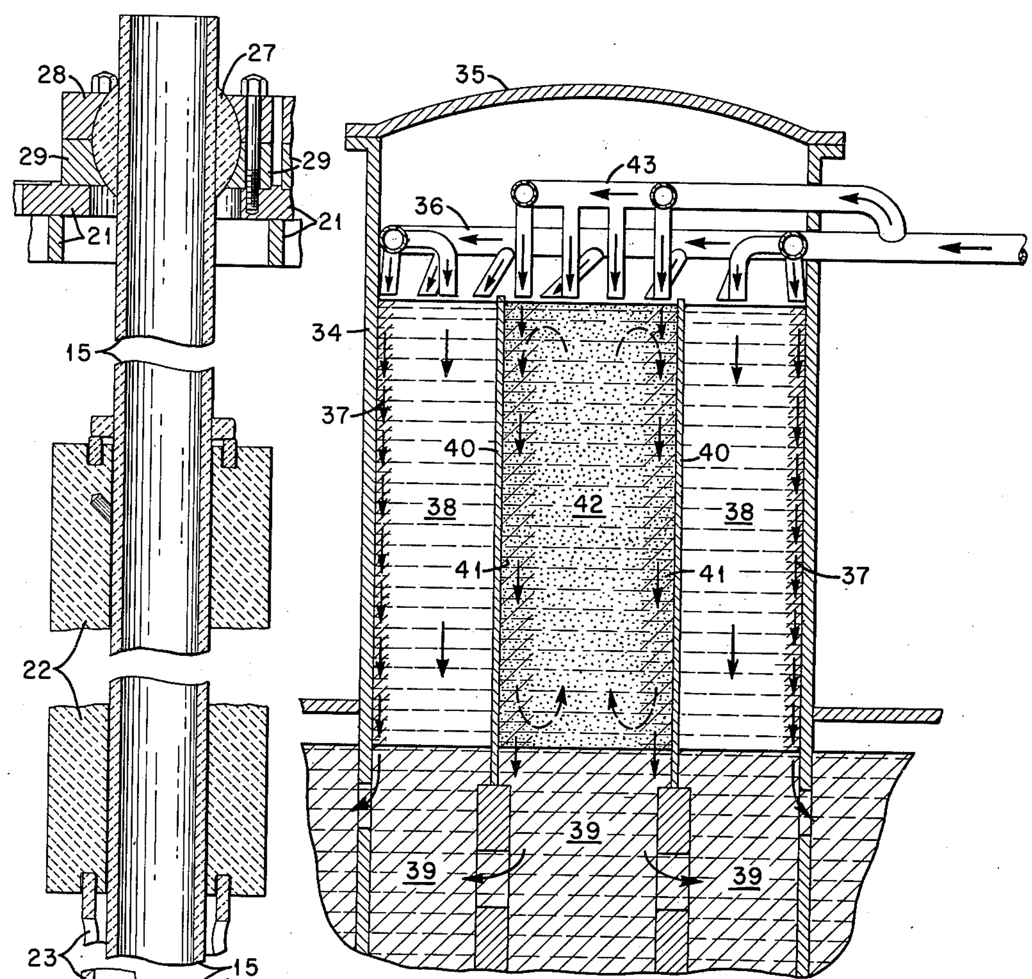
FIG. 5 is a vertical sectional view of an alternate neutronic reactor embodiment constructed in accordance with the present invention.

An alternate embodiment designed to increase breeding and to further alleviate the problems of corrosion and hot spotting in reactor structural materials is illustrated in FIG. 5. The reactor vessel wall 34 is fabricated of Croloy in the form of a right circular cylinder. A domed top 35 seals the top of the reactor vessel. A first toroidal header 36 provides a continuous spiralling flow of molten lead along wall 34 of the reactor vessel. Immediately adjacent to and supported by the flowing lead lining 37 is a blanket region 38 of fused salt containing fertile material. Blanket region 38 floats on molten lead in reservoir 39 similar to the reservoir described in reference to FIG. 1. Molten lead is dropped directly through blanket region 38 from first toroidal header 36 to effect agitation and heat removal therefrom. The heavier lead coolant separates from the blanket salt due to gravity and settles into the lead reservoir below the reactor vessel. The inner wall 40 of the blanket region 38 is of a metal such as niobium compatible with both lead and fused salts. Next to the blanket region inside inner wall 40 is the cooling region 41 of the reactor active core region 42. Molten lead falls into the cooling region 41 from a second toroidal header 43 located above the active core region. There is no physical separation between the cooling region 41 and the remaining portion of active core region 42. Molten lead is dropped from header 43 at a rate such that there is about three parts lead to each part of salt in the cooling annulus. Circulation of the salt and the removal of heat therefrom occurs in substantially the same manner as was described in the earlier reference to FIG. 1.

The active core region 42 is 5.35 ft. in diameter by 6 ft. high and contains 205 cubic ft. of fuel salt. The cooling annulus contains 70 cubic ft. of fuel leaving 135 cubic ft. in the active core region exclusive of the annular cooling region 41 contained therein. At any one time there are 278 cubic ft. of lead in the reactor vessel. The lead velocity is 12.35 ft./sec. through the reactor which is well below the maximum permissible.

This embodiment is desirable from the breeding standpoint as it operates as a fast reactor. Fast reactors are generally recognized as being capable of producing greater breeding ratios than thermal reactors due to the greater average number of neutrons which are released per fission in fast neutron induced fissions.

The above description of the invention was offered for illustrative purposes only, and should not be interpreted in a limiting sense. It is intended that the invention be limited only by the claims appended hereto.

What is claimed is:

1. A fused-salt-fueled, molten-metal-cooled neutronic reactor comprising:

(a) a containment vessel;
(b) molten lead filling the lower portion of said containment vessel to form a molten lead reservoir;
(c) a fused-salt active region floating on said molten metal reservoir;
(d) means for passing molten lead from said reservoir downwardly through said active region; and
(e) means for removing heat from said reservoir.

2. A fused-salt-fueled, molten-metal-cooled neutronic reactor comprising:

(a) a containment vessel;
(b) molten metal filling the lower portion of said containment vessel to form a molten lead reservoir;
(c) an active core region comprising fused-salt containing fissile material floating on said molten lead reservoir;
(d) a blanket region comprising fused-salt containing fertile material floating on said molten metal reservoir, said blanket region being adjacent to, but physically separated from said active core region;
(e) means for passing molten metal from said reservoir downwardly through said active core region and said blanket region; and
(f) means for removing heat from said molten metal reservoir.

3. A fused-salt-fueled, molten-lead-cooled thermal breeder reactor comprising:

(a) a containment vessel;
(b) molten metal filling the lower portion of said containment vessel to form a molten lead reservoir;
(c) a multiplicity of graphite fuel tubes vertically oriented above said molten lead reservoir and spaced apart therefrom;
(d) graphite members affixed to said graphite fuel tubes along a portion of their length, said graphite members substantially filling the interstices between said graphite fuel tubes;
(e) a plurality of vertically oriented graphite return pipes spaced apart radially from said fuel tubes;
(f) fused-salt-containing fissile material floating on said molten lead reservoir, said fused salt filling said graphite fuel tubes and said graphite return pipes;
(g) fused-salt containing fertile material disposed about said graphite members and said graphite return pipes;
(h) means for pumping molten lead from said reservoir to the tops of said graphite return pipes, said molten lead being discharged into said return pipes to cool and circulate said fused salt containing fissile material; and
(i) means for removing heat from said molten lead.

4. A fused-salt-fueled, molten-lead-cooled thermal breeder power reactor comprising:

(a) a containment vessel comprising:
  (1) a lower portion having a generally cruciform horizontal cross section,
  (2) an upper portion integral with and disposed on top of said lower portion, said upper portion generally defining a right circular cylinder;
(b) molten lead coolant substantially filling said lower portion of said containment vessel to form a molten lead reservoir;
(c) a first tube sheet disposed horizontally across the bottom of said upper portion of said containment vessel;
(d) a second tube sheet disposed horizontally across the top of said upper portion of said containment vessel;
(e) a multiplicity of centrally located graphite fuel tubes vertically oriented above said molten lead reservoir and spaced apart therefrom, said graphite fuel tubes passing through said first and second tube sheets;
(f) a plurality of vertically oriented graphite return pipes spaced apart radially from said fuel tubes, said graphite return pipes passing through said first and second tube sheets;
(g) fused salt containing fissile material floating on said molten lead reservoir, said fused salt filling said graphite fuel tubes and said graphite return pipes;
(h) fused salt containing fertile material disposed about said graphite members and said graphite return pipes, said fused salt being restricted to the area within said containment vessel between said first and second tube sheets;
(i) pumping means for removing lead from the radial extremities of said lower portion of said containment vessel and discharging it into the tops of said graphite return pipes; and (j) means for removing heat from said molten lead within said lower portion of said containment vessel.

5. A fused-salt-fueled, molten-lead-cooled neutronic reactor comprising:

(a) a containment vessel;

(b) molten lead filling the lower portion of said containment vessel to form a molten lead reservoir;

(c) a centrally located active core region comprising fused salt containing fissile material floating on said molten lead reservoir;

(d) an annular blanket region comprising fused salt containing fertile material floating on said molten lead reservoir, said blanket region being adjacent to, but physically separated from, said active core region;

(e) means for passing molten lead from said reservoir downwardly through said active core region and said blanket region;

(f) means for providing a flowing layer of molten lead between said blanket region and said containment vessel; and (g) means for removing heat from said molten lead reservoir.

6. The neutronic reactor of claim 5 wherein said means for providing a flowing layer of molten lead between said blanket region and said containment vessel comprises a toroidal header having discharge ports adapted to discharge lead tangentially along the wall of said containment vessel thereby providing a spirally flowing layer of lead between said blanket region and said containment vessel.

References Cited by the Examiner

UNITED STATES PATENTS

| | | | |
|---|---|---|---|
| 3,029,142 | 4/1962 | Coffinberry ---------- | 176—49 |
| 3,161,570 | 12/1964 | Hammond et al. ------ | 176—49 |

FOREIGN PATENTS

| | | |
|---|---|---|
| 856,946 | 12/1960 | Great Britain. |

OTHER REFERENCES

Nuclear Science and Engineering: 2, 1957, "Molten Fluorides as Power Reactor Fuels," pp. 797–803.

References Cited by the Applicant

UNITED STATES PATENTS

| | | |
|---|---|---|
| 2,877,171 | 3/1959 | Burton. |
| 3,009,866 | 11/1961 | Fraas. |

L. DEWAYNE RUTLEDGE, *Primary Examiner.*

H. E. BEHREND, *Assistant Examiner.*